UNITED STATES PATENT OFFICE.

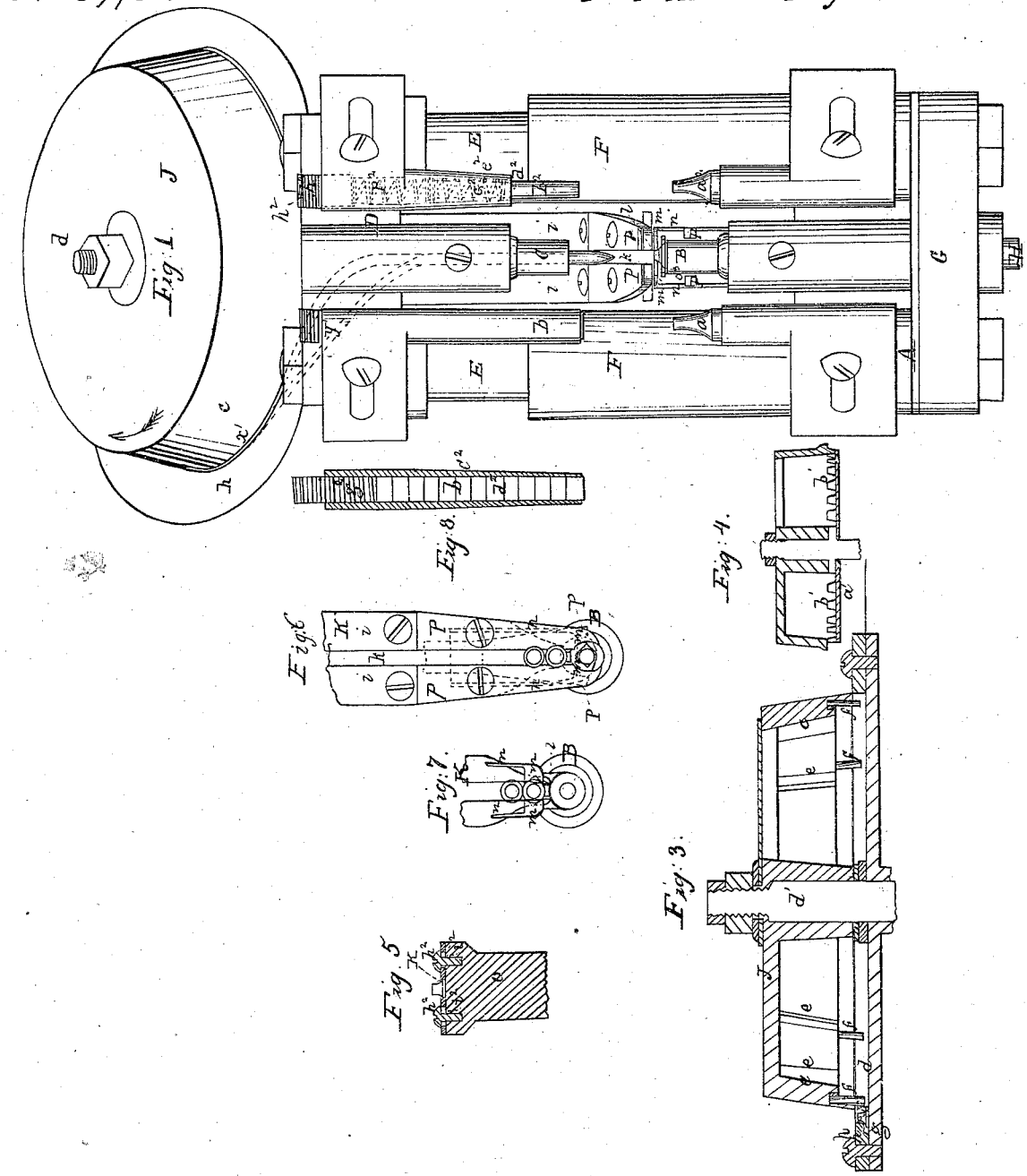

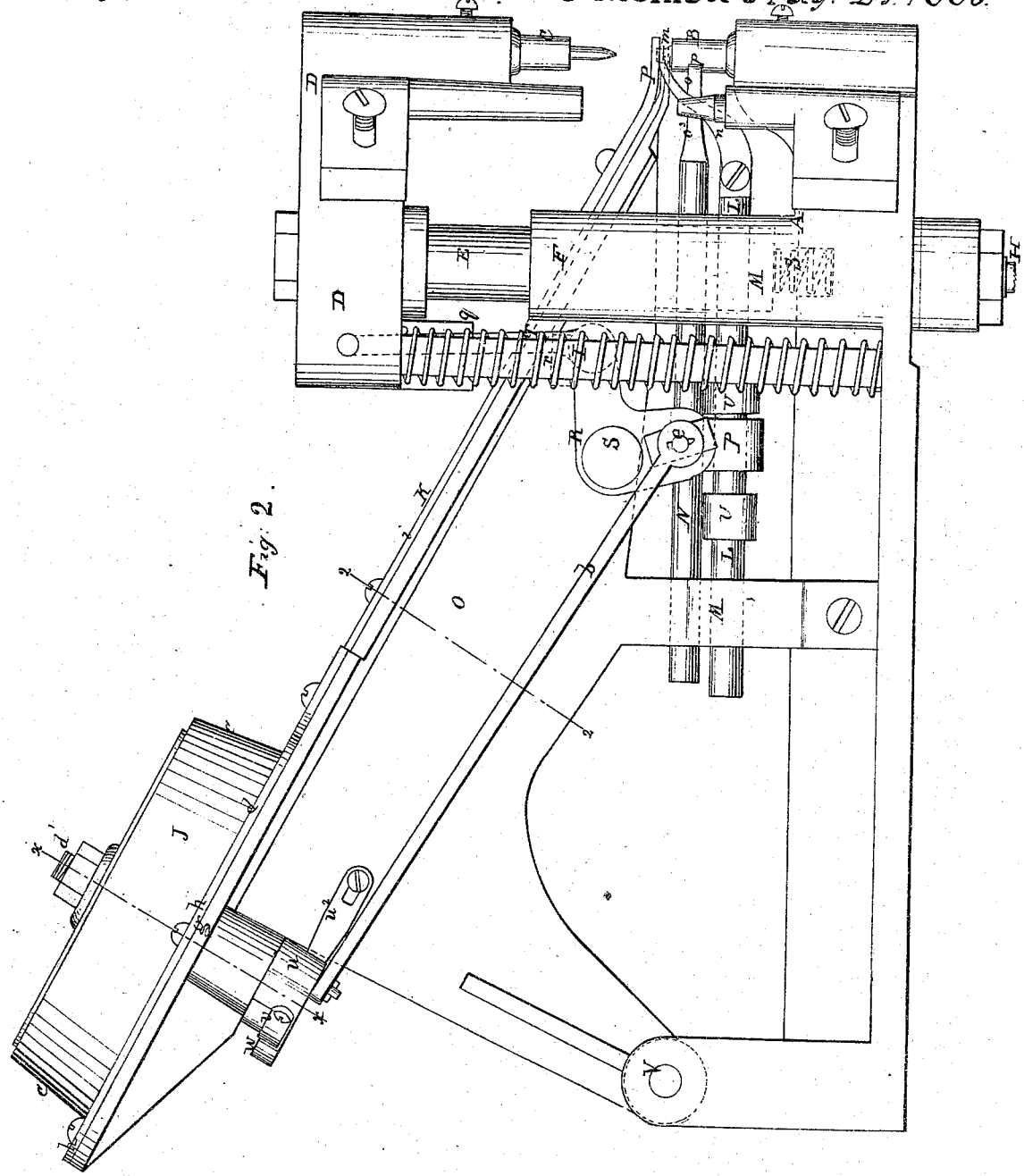

JOSEPH F. SARGENT, OF BOSTON, MASSACHUSETTS, ASSIGNOR TO HIMSELF AND ELMER TOWNSEND, OF SAME PLACE.

IMPROVEMENT IN EYELETING-MACHINES.

Specification forming part of Letters Patent No. 39,705, dated August 25, 1863.

*To all whom it may concern:*

Be it known that I, JOSEPH F. SARGENT, of Boston, county of Suffolk, and State of Massachusetts, have invented an Improved Eyeleting-Machine; and I do hereby declare that the following, taken in connection with the drawings which accompany and form part of this specification, is a description of my invention sufficient to enable those skilled in the art to practice it.

My invention relates to certain improvements in eyeletting-machines; and it consists in an improved method of feeding or presenting the eyelet to the action of the setting-tool; also, in a new construction and operation of a hopper for dropping or delivering the eyelets into the chute or eyelet-passage way leading from the hopper to the setting-tool; also, in making the chute so adjustable as to adapt it to the conveyance and delivery of eyelets of different or varied sizes; also, in an improved construction of the punch-beds, against which the punches cut the holes for insertion of the eyelets.

The improvements are shown in the accompanying drawings, wherein Figure 1 represents a front elevation, and Fig. 2 a side elevation, of the machine; Fig. 3, a cross-section of the hopper and chute, taken on the line $xx$ of Fig. 2. Fig. 4 shows a modification of the construction of the hopper. Fig. 5 is a cross-section of the chute, taken on the line $zz$ of Fig. 2. Fig. 6 shows a plan of the lower end of the chute, with the fingers or forceps which grasp and carry the eyelet to be operated upon by the set, said figure showing the fingers holding the eyelet over the lower set. Fig. 7 shows the position of the fingers when about to grasp the eyelet. Fig. 8 is a vertical section of one of the punch-beds.

A denotes the frame of the machine; B, the lower eyelet-set or anvil, and C the upper set. The anvil B is stationary, while the upper set operates vertically upon it to clinch the eyelet placed thereon. The set C for this purpose is fastened in or to a carriage, D, fixed upon the top of vertical shafts E, which work through bearings F in the frame A, and are connected at their lower end by a cross-bar, G, to which a treadle-rod, H, is fastened. Pressure on the treadle causes the descent of the carriage D and set C, while their upward or return movement is produced by a spring, I, or other suitable means. Punches $a a^2$ are arranged in connection with punch-beds $b$ $b^2$ and sets B C, so as to space the eyelets during the operation of inserting them into the stock, substantially in the same manner as in the machine patented by me on the 6th day of January, 1863. The hopper for containing and delivering the eyelets is shown at J, while the chute or eyelet-passage leading from the hopper down to the eyelet-sets is seen at K.

The construction and operation of the hopper is as follows: It is made of cylindrical or approximately cylindrical form, and with slightly-flaring sides $c$, and it rotates freely on or with a spindle, $d'$. It is open at the bottom and the eyelets rest upon a plate or surface, $d$, the extension of which forms the bottom surface of the chute, over which the eyelets slide in their passage to the sets. From the inner side surfaces of the hopper ribs or projections $e$ extend, said projections serving to agitate and keep in motion the eyelets, as the hopper revolves. Brushes $ff$ extend from the bottom edge of the sides $c$ nearly down to the plate $d$, or to such distance therefrom as to pass over the flanges of eyelets lying in their path in an upright position. The distance between this lower edge of the hopper side and the surface $d$ is graduated to the height of the eyelets to be used, washers on the spindle $d'$ serving to adjust the same to eyelets of different sizes. The plate or surface $d$ extends out from the side of the hopper, as seen at $g$, and a plate, $h$, is fastened thereon, the inner edge of said plate forming one side of the chute. As the hopper revolves in the direction indicated by the arrow in Fig. 1, the body of eyelets is kept stirred by the ribs $e$. Those eyelets which stand with their large ends on the surface drop through the space between the lower edge of the hopper and the contiguous portion of the chute, and thence slide freely down the chute. If any eyelets are bottom side up, they too can slip between the two surfaces named; but when the outer edge of the flange of the eyelet strikes against the inner edge of the top plate, $h$, of the chute, its opposite edge will yet project a little into the hopper, and, as the nearest brush in its revolution strikes against such edge, it carries the eyelet around with it until it comes into such a position that by the action of gravity it slides back into the body of the hopper. Eyelets resting or lying on their sides cannot pass through under or by the edge of the hopper, because they present too much breadth in this position; but they are swept up and around the inner surface until they again fall into the body of the hopper, or against the upper part of the body of eyelets contained therein. The plate h is made capable of adjustment to adapt the part of the chute formed thereby to eyelets of different sizes in the same manner as are the plates i, to be hereinafter described. Thus it will be seen that the revolution of the hopper, in connection with the inclined surface beneath, and the chute opening or starting from its side, serves to constantly agitate the eyelets to remove from the passage therefrom all eyelets not properly presented and return them to the upper part of the collection of eyelets in the hopper, and to allow and cause the passage of the eyelets into the chute whenever in a proper condition they come against the throat of the chute.

A modification of my revolving hopper is shown in Fig. 4. In this form, as in the other, the hopper, by its revolutions, presents the eyelets to and causes them to drop into the eyelet chute or passage, this being accomplished by making the floor or bottom plate, $a'$, revolve with the hopper, (no ribs, projections, or brushes being then necessary, as in Fig. 3,) gaged openings $b'$ $b'$, or a gaged space between the bottom edge of the hopper and the plate $a'$, serving to permit and regulate the passage of the eyelets from the hopper into the chute. While differing, therefore, somewhat in its construction and operation, this modification still contains the same feature or invention shown in Figs. 1, 2, and 3—that is to say, the eyelets contained in either form of hopper are caused by the rotation of said hopper to be thrown or carried against, and so as to drop into a chute or eyelet passage leading therefrom.

Other modifications embodying the same invention will readily be suggested to mechanicians using or making this machine.

From the hopper the chute descends, as seen in Fig. 2. The plates i forming, in connection with the bottom surface, k, said chute or roadway, are made with projecting edges or lips to lap over the flange of the eyelet, as seen in Fig. 5.

I have before remarked that the hopper is made so adjustable as to allow of the use of eyelets of different sizes, such adjustability having reference to the height or length of the eyelets.

To complete the adjustability for the machine, it is necessary to make the width of the chute or the distance between the adjacent edges of the plates i conform to the diameter or width of the particular-sized eyelet employed. This I accomplish by applying the plates to the chute-frame by adjusting-screws $h^2$ and slots $i^2$, so that the plates can be moved laterally toward or away from each other. At the foot of the chute it is provided with a spring or projection, $l$, against and by which the eyelets are stopped as they descend, and the inner edges of the chute-plates may be made slightly converging for the same purpose. This stops the advanced eyelet just in rear of the set $b$, and with its bottom surface on or about on a level therewith. Here the eyelet is grasped and carried onto the set, as follows: Two forceps or plates or fingers, $m$ $m$, are applied to the upper ends of springs or arms $n$ $n$, which are fastened to the front end of a horizontal shaft, L, moving back and forth in bearings M M, extending from the chute and hopper frame O. Just above this shaft is another shaft, N, having similar back-and-forth horizontal movement. At the front end of this shaft a fork or spreader, $O^3$, is placed, the arms $p$ $p$ of the same being in contact with the inner sides of the springs $n$ $n$, and in such manner that retrograde movement of the shaft N in drawing back these arms $p$ $p$ causes them to open or spread the fingers $m$ $m$. The shaft N is affixed to and impelled with a bearing, P, through which the other shaft, L, slides. This bearing is jointed by a joint-pin, Q, to the lower arm of a bent lever, R, which turns on a fulcrum, S, on the frame O, and has its upper arm jointed by a connecting rod, T, to the carriage D. This movement of the carriage D up and down imparts horizontal movements to the shaft L. Collars V are placed on the shaft N, and the movements of the bearing P over this shaft causes the bearing to strike against the collars and actuate the shaft. Two guardplates, $p$ $p$, are screwed upon the lower end of the chute-plates, serving to keep the stock from contact with the fingers. The chute-frame O is hung at its rear end on a rocker-shaft, V, so that its front end and the front end of the chute, the plates $p$ $p$, and the fingers $m$ $m$ shall be capable of depression to such extent as shall carry the chute, fingers, and plates, from their normal position, as seen in Fig. 2, down below the level of the top of the lower set or anvil B. The spring I serves to return the carriage D to its highest position, while the extent of its downward movement is controlled by contact of the sets B C. The downward movement of the front end of the chute-frame is produced by a projection, $q$, from the carriage-frame D striking against a projection, $r$, from the chute-frame, while its return movement is produced by a spring, S, as will be readily understood.

Supposing an eyelet to be held over the set B by the fingers, as seen in Fig. 6, the operation of the machine is as follows: As the carriage D begins to descend, the connecting-rod T turns the lever R and drives back the shaft N and its spreader or fork O, and the spreader opens the fingers $m$ $m$, loosening their grasp on the eyelet, which they leave in proper position on the lower set or anvil, B. The lower shaft, L, remains stationary until the fingers have so far separated as to allow them to clear the eyelet as they retreat, when the bearing P, striking the rear collar U, on the shaft L, will push back the shaft L and the fingers m m. As soon as they have retreated out of the way of the lower set, the projection q strikes against the projection r and depresses the fingers, guard-plate, and chute, leaving the top surface of the anvil free for contact of the work and insertion of the eyelet therein, the only supporting-surface for the work being the top surface of the anvil. The tip or point of the upper set passes into and keeps the eyelet in place while the fingers are retreating and being depressed. After the eyelet is clinched, as the set C begins to rise, the chute-frame rises and the fingers m m come opposite to the advanced eyelet lying at the end of the chute, as seen in Fig. 7. As the carriage D continues to rise, the connecting-rod T forces the shaft N forward, which releases the finger-springs n n and permits the fingers m m to approach and grasp the eyelet. As the rise of the carriage D continues, the bearing P strikes the front collar U of the shaft L and forces this shaft forward with the shaft N, thus carrying the eyelet onto the anvil-set, and in position to be clinched at the next descent of the upper set. As the eyelet is drawn away from the chute, the pressure of the column of eyelets forces the next succeeding one to the foot of the chute, where it will be held as previously described. Thus it will be seen that, instead of carrying or feeding the eyelet into position to be inserted and clinched in the work by the point of the set passing into and carrying it, as is done in my patent above referred to, or instead of pushing it from behind, as is done in some other machines, I grasp the eyelet firmly upon its sides, and am enabled by this means to much better present it than by either of the other means.

Instead of extending the chute up to or nearly to the anvil B, as shown and described, its mouth may terminate at such a distance back therefrom as to enable me to dispense with the depression given to the chute to clear it and the fingers from the work, and the fingers being made to retreat far enough to take the eyelet from the chute. The lower arm of the bent lever R has a connecting-rod, T, jointed to it and connecting it with a rocker-arm, u, turning upon the hopper-spindle. To this rocker-arm an impelling spring-pawl, v, is fastened, the end of said pawl working against the teeth of a ratchet-wheel, w, fixed upon the bottom of the hopper-spindle. Descent of the carriage D produces movement of the connecting-rod T, rocker-arm u, and pawl v, and thus rotates the ratchet-wheel and the eyelet-hopper. Movement of the hopper in the contrary direction is prevented by a spring, $w^2$, fastened to the frame, and extending against the teeth of the ratchet. When the hopper is first charged or supplied with eyelets, it is rotated by hand for a few moments, when the chute will become filled with eyelets, and after this the intermittent motion produced by the ratchet and pawl will suffice to keep the chute fully supplied.

I make the punch-beds $b$ $b^2$ of the punches $a$ $a^2$ as follows: In the bed $a$, I have shown a cylinder, $c^2$, containing small pistons or sections $d^2$ of wood, as seen in Fig. 8, said sections fitting closely into the cylinder and being operated upon to produce endwise movement of the sections or of the surfaces operated against by the punch by a screw, $g^2$. By this construction I am enabled to adjust the surface against which the punch acts to the thickness of work being eyeleted, as the thickness of the work controls the extent of descent of the upper set, and consequently the extent of descent of the punch-bed. The same object is obtained in the punch-bed $b^2$ by using a metallic piston, $d^2$, the extent of whose downward movement as the bed descends is regulated by springs $e^2$ $p^2$ and a screw, $h^2$. The spring $f^2$ also gives a yielding surface to the bottom of the piston. By using the sections of wood as seen in Fig. 8 new surfaces or sections can be brought down to the mouth of the cylinder as the old ones become worn or destroyed. The chute is shown in Fig. 1 as extending from the point $x'$, where the eyelets leave the hopper, around for some distance therefrom circumferentially with the lower edge of the hopper before it turns into the straight channel leading to the sets. I sometimes prefer, however, to lead this part of the chute tangentially from said point $x'$ to said straight part of the channel, as shown by dotted lines at $y'$ in Fig. 1.

I claim—

1. The employment of nippers, forceps, or fingers to grasp or surround each eyelet successively, and to convey it from the end of the chute to the place where it is set or riveted, in contradistinction to entering each eyelet with a pointed feeder or to pushing it from behind.

2. The rotating hopper arranged to operate on the eyelets substantially as described.

3. Making the hopper adjustable to different heights of eyelets.

4. The chute adjustable to different diameters of eyelets, as set forth.

5. The combination of an adjustable hopper with an adjustable chute, substantially as specified.

6. Constructing the punch-bed of a cylinder and adjustable piston.

7. Making the piston in sections, substantially as described.

8. The mechanism for imparting motion to the fingers or forceps, arranged and operated substantially as set forth.

Executed this 19th day of June, A. D. 1863.

JOS. F. SARGENT.

Witnesses:
J. B. CROSBY,
FRANCIS GOULD.